US 9,166,458 B1
(12) United States Patent
Burns, III et al.

(10) Patent No.: US 9,166,458 B1
(45) Date of Patent: Oct. 20, 2015

(54) PUMP/GENERATOR OVER-UNITY APPARATUS AND METHOD

(71) Applicants: Gordon Charles Burns, III, Helena, MT (US); David Alan Parfitt, Earby (GB); Jason Charles Foley, Lake Hiawatha, NJ (US)

(72) Inventors: Gordon Charles Burns, III, Helena, MT (US); David Alan Parfitt, Earby (GB); Jason Charles Foley, Lake Hiawatha, NJ (US)

( * ) Notice: Subject to any disclaimer, the term of this patent is extended or adjusted under 35 U.S.C. 154(b) by 0 days.

(21) Appl. No.: 14/641,815

(22) Filed: Mar. 9, 2015

(51) Int. Cl.
*F03B 13/00* (2006.01)
*F03B 13/10* (2006.01)
*H02P 9/04* (2006.01)
*H02K 7/18* (2006.01)
*F01D 15/10* (2006.01)
*F03B 17/00* (2006.01)

(52) U.S. Cl.
CPC .............. *H02K 7/1823* (2013.01); *F01D 15/10* (2013.01); *F03B 13/10* (2013.01); *F03B 17/005* (2013.01); *Y10S 415/916* (2013.01)

(58) Field of Classification Search
CPC ........ H02K 7/09; Y02E 10/22; Y02E 10/223; F03B 3/04; F04D 3/02; F04D 13/0646; F04D 1/04; F04D 29/048; F04D 7/04; F05B 2280/5008; F05B 2220/20; F05B 2240/511; F05B 2250/25; B63H 23/24; B63J 2003/002; B63J 2003/046; F05D 2220/20; F05D 2240/243; F16C 32/0429; H01F 7/0236; Y02B 10/50; Y10S 416/04
USPC ................... 290/1 A, 4 D, 52, 54–55, 43–44; 415/916, 218.1; 73/861.78; 310/90.5, 310/102 R, 103, 114, 87; 416/DIG. 4, 177, 416/189; 417/365, 420, 423.5; 384/15; 60/221; 440/48
See application file for complete search history.

(56) References Cited

U.S. PATENT DOCUMENTS

| | | | |
|---|---|---|---|
| 622,474 A | 2/1948 | Hoskin | |
| 2,436,683 A | 2/1948 | Wood, Jr. | |
| 2,495,745 A * | 1/1950 | Litton | 290/52 |
| 4,174,484 A * | 11/1979 | Schmider | 310/68 R |
| 4,176,283 A | 11/1979 | McLaren | |
| 4,211,452 A * | 7/1980 | Poubeau | 310/90.5 |
| 4,334,160 A * | 6/1982 | McCarty | 310/57 |
| 4,340,261 A * | 7/1982 | Wehde | 310/90.5 |
| 4,367,413 A | 1/1983 | Nair | |
| 4,574,728 A * | 3/1986 | Barnard, Jr. | 116/267 |
| 4,740,711 A | 4/1988 | Sato et al. | |
| 4,759,842 A * | 7/1988 | Frees et al. | 210/94 |
| 4,963,780 A * | 10/1990 | Hochstrasser | 310/104 |
| 5,045,711 A * | 9/1991 | Swearingen | 290/52 |
| 5,209,650 A | 5/1993 | Lemieux | |
| 5,349,985 A | 9/1994 | Fischer | |
| 5,818,131 A * | 10/1998 | Zhang | 310/15 |

(Continued)

*Primary Examiner* — Tulsidas C Patel
*Assistant Examiner* — Charles Reid, Jr.

(57) ABSTRACT

The pump/generator apparatus and method provides a series of pump/generator devices, having magnets in place of conventional bearings, to generate electrical energy, creating a pump/generator for flowing liquids or gases. Stator coils on the outside of the housing gather electric current. The apparatus requires initial input power from an external power source to start the pumping and provides an initial external reservoir of liquid or gas flowing into the apparatus. A hollow turbine housing receiving flowing gas or liquid, encloses a freely spinning hollow drive cylinder. A helicoidal impeller gives the drive cylinder thrust to spin. Ring magnets vertically support the helicoidal impeller allowing the drive cylinder to float freely in the pipeline. Stator coils wind around and ring the exterior side of the housing to generate electric current.

29 Claims, 7 Drawing Sheets

(56) References Cited

U.S. PATENT DOCUMENTS

| | | | |
|---|---|---|---|
| 6,011,334 A | 1/2000 | Roland | |
| 6,036,333 A * | 3/2000 | Spiller | 362/192 |
| 6,873,085 B2 * | 3/2005 | Graham et al. | 310/266 |
| 7,021,905 B2 * | 4/2006 | Torrey et al. | 417/356 |
| 7,385,303 B2 | 6/2008 | Roos | |
| 7,425,772 B2 * | 9/2008 | Novo Vidal | 290/52 |
| 7,605,490 B2 * | 10/2009 | Srybnik et al. | 290/54 |
| 7,723,860 B2 | 5/2010 | Nagler | |
| 7,843,099 B2 | 11/2010 | Fielder | |
| 7,980,143 B2 | 7/2011 | Peleg | |
| 2001/0009645 A1 * | 7/2001 | Noda | 417/355 |
| 2003/0072617 A1 * | 4/2003 | Burns, II | 405/81 |
| 2005/0189772 A1 * | 9/2005 | Gozdawa | 290/52 |
| 2006/0158053 A1 * | 7/2006 | Aschoff et al. | 310/91 |
| 2007/0041823 A1 * | 2/2007 | Miller | 415/4.1 |
| 2007/0216245 A1 * | 9/2007 | Fielder | 310/102 R |
| 2008/0217923 A1 * | 9/2008 | Yen | 290/54 |
| 2009/0250933 A1 * | 10/2009 | Delf | 290/52 |
| 2010/0181858 A1 * | 7/2010 | Hibbs et al. | 310/156.07 |
| 2010/0270805 A1 | 10/2010 | Kazadi | |
| 2010/0308587 A1 * | 12/2010 | Tu et al. | 290/52 |
| 2010/0327589 A1 * | 12/2010 | Macchia | 290/52 |
| 2011/0057442 A1 * | 3/2011 | Chauvin | 290/43 |
| 2011/0062716 A1 | 3/2011 | Zeuthen | |
| 2011/0221197 A1 * | 9/2011 | Peleg | 290/52 |
| 2012/0013125 A1 * | 1/2012 | Myers et al. | 290/52 |
| 2012/0175883 A1 * | 7/2012 | Nica | 290/55 |
| 2012/0175885 A1 * | 7/2012 | Peer | 290/1 A |
| 2013/0164161 A1 | 6/2013 | Schöb | |
| 2013/0209292 A1 * | 8/2013 | Baykut et al. | 417/420 |
| 2014/0070651 A1 * | 3/2014 | Gerfast | 310/114 |
| 2014/0265336 A1 * | 9/2014 | Aubuchon, Sr. | 290/52 |

* cited by examiner

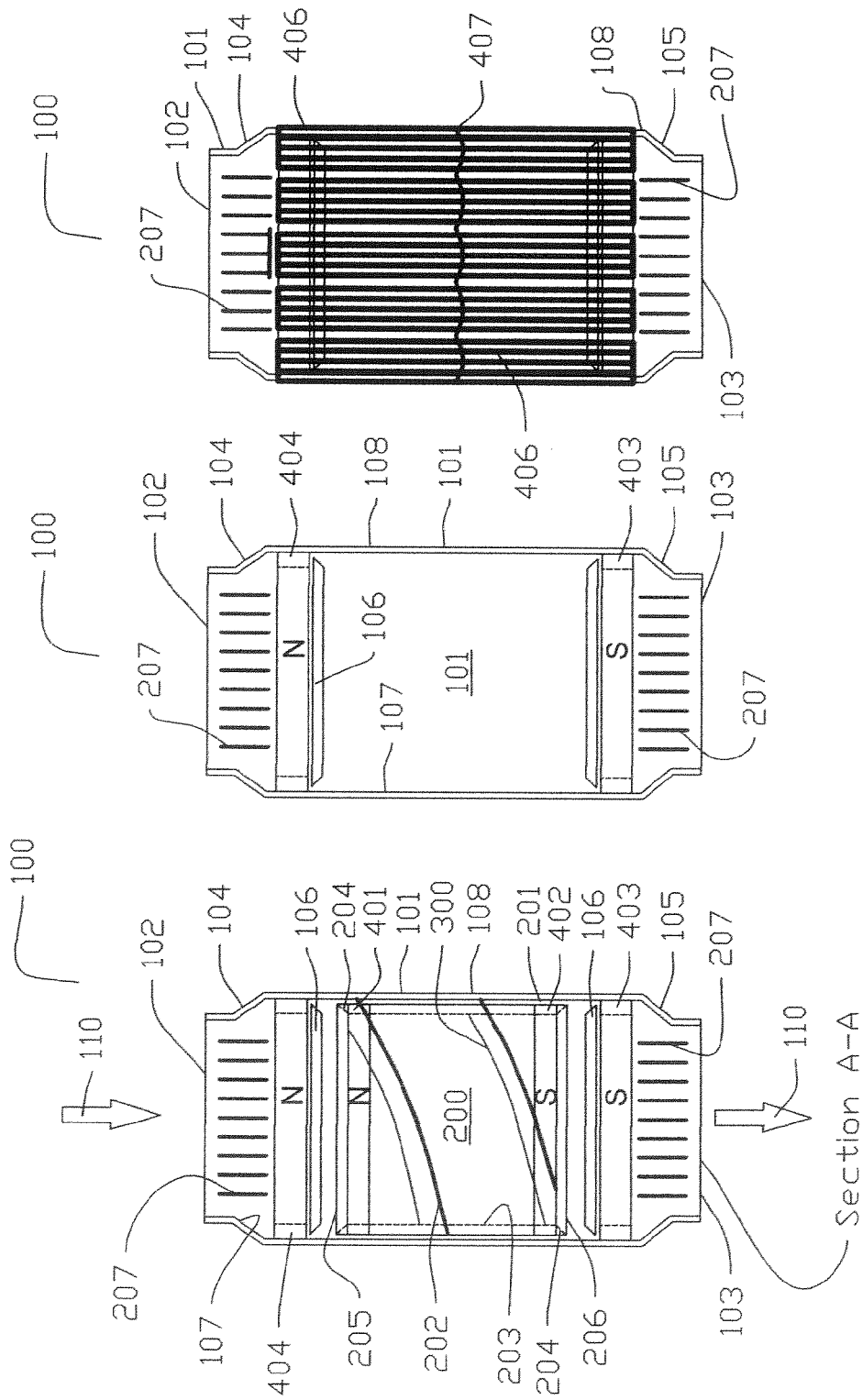

PUMP/GENERATOR OVER-UNITY APPARATUS AND METHOD

FIELD OF THE INVENTION

This invention relates to pumps and generator devices which are compact and low maintenance, moving either liquid matter or gas matter. The invention is an apparatus comprising a series of pump/generators with low maintenance, higher flow rates, which are lighter and more compact without bearings which would cause contamination from bearing grease or debris. The apparatus provides a series of pump/generator devices having magnets in place of conventional bearings, bushings or axles to generate electrical energy from the spinning of the magnets within the apparatus, creating a pump/generator with high flow rates, for either liquids or gases. At the same time, stator coils are provided on the outside of the housing to the invention with which to gather electric current. The apparatus requires a small amount of initial input power from an external power source to start the pumping means and provides an initial external reservoir of matter (liquid or gas) flowing into the apparatus.

BACKGROUND

Fluid pumps and generator devices are found or utilized in residential waterlines, hotels, office buildings, water park pump systems, pools, car washes, laundry services, city water mains and water towers, and hydroelectric dams; and anywhere fluid, including water, is being moved through pipes. Although there are many liquid and gas pumps in the industry, there is a need for a pump/generator apparatus to both generate secondary power and pump liquid or gas, which is low maintenance, having higher flow rates than the current devices, which would at the same time have universal applicability and is lighter and more compact, and efficient, without having the commonly used bearings. Contamination from bearings, from grease or debris, or from shafts and shaft seals that would normally be used in pumps and generators for liquid or gas matter cause resistance to the moving parts. Two advantages to a bearing-less apparatus are a longer lifetime and higher efficiency for new uses.

Friction creates heat and loss of potential energy as well as wear on parts. Using magnets in place of traditional bearings and other moving parts creates a low friction environment. Supporting a moving part while under load without causing significant friction but still having the ability to move liquids or gas, or generate electricity by the movement of liquids and gases, is a great advantage, thereby reclaiming significant energy being used in flowing pipelines without restricting flow of the liquid or gas.

While there are centrifugal pumps, pumps with external motors or drives, pumps with bearings, and electrical generators; there are no "liquid pumps/generators" or "gas pump/generators" found on the market, devices which may act as both a pump and a generator with the structural characteristics of the invention. Nor is there technology providing the same or similar results in the current industry, such as with wind farms, hydroelectric dams and solar power. There are no inventions in the related art which have the structure of the invention or teach the disclosures of the invention, such as having a suspended, frictionless device, with no points of contact between the stationary housing and spinning cycle, as would be found with devices having conventional bearings. As well, there are no inventions in the related art which generate electricity in a closed pipe system requiring no external source of power after initial sourcing and generation of power as in the invention.

The US Patent Application to Kazadi No. 2010/0270805 ("Kazadi") discloses a wind turbine having magnets for generating supplemental energy and levitating a drive shaft in a friction free manner. Kazadi discloses magnets used as an axle to reduce friction, as well as one or more stationary points of contact between the cylinder and the impeller. The embodiment of the invention discloses no points of contact, and no seals or conventional bearings. The only contact with the spinning drive cylinders of the embodiment of the present invention is fluid propelling the impellers.

The US Patent Application to Zeuthen et al No. 2011/0062716 ("Zeuthen") discloses a wind turbine having magnetic bearings that are ball-like rather than non-cylindrical. Zeuthen utilizes magnets to aid against an asymmetrical loading for a wind turbine, thereby providing a "sideways" push, as opposed to the bearing-like thrust disclosed by the embodiment of the present invention made from two opposing ring magnets pushing in one elevational direction in the pump/generator devices. As well, Zeuthen discloses a center axis to rotate on itself, having a bearing in the center of the cylinder restricting fluid passing through the cylinder, unlike the structure of the invention, which has no fluid restriction.

The Hoskin U.S. Pat. No. 622,474 ("Hoskin") discloses a fluid turbine having a helical impeller, bearings and an armature of an electromagnetic motor, requiring an iron core exterior of the turbine. In particular, Hoskin provides a side feed structure to power the invention, and side inlet and exit ports due to centrifugal effect on the fluid, rather than top or bottom feed with an opposing exit as the present invention. Hoskins would not use or teach the use of the magnetic bearings of the invention due to the uneven pressures that would be caused by the side inlet and outlet. Also, the embodiment of the present invention uses a serpentine coil in the devices, turning the generators into fully reversible pumps.

Hoskin would not teach providing magnetic bearings because it requires an iron core coil in that invention, which would cause an attraction between the iron core inside the coil and the magnetic drive cylinder resulting in energy loss, making it inoperative for such an intended purpose, teaching against any combination, and not create the friction-free assembly structure of the invention for generating energy supplemental to the turbine. The invention uses iron free serpentine, copper coils, and not a conventional coil arrangement. Therefore, the prior art would not be available in the turbine art, despite their use of impellers for generating electricity.

U.S. Patent Application to Schöb, No. 2013/0164161 ("Schöb") discloses a centrifugal pump and the use of an external electric drive motor to produce rotational energy, not the structure of the preferred embodiments of the present invention.

Schöb would not teach the use of generating coils on the outside of the cylinder as in the invention because such use would be non-enabling, interfering with its drive and bearing coils. As well, Schöb, while disclosing magnets and coils, does not teach the use as a generator or the reverse flow of fluid, in addition to other disclosures of the embodiments of the invention.

Other related art discloses the use of conventional bearings located within the cylinder housing restricting the flow of liquid or gas and other structures differing from the cylinder structure of the present invention. Some related art uses ferromagnetic materials such as conventional bearings which would not teach the embodiments of the present invention due to constant attraction and pull from the permanent magnets. All the related art discloses structural differences to the preferred embodiment of the present invention. None of the aforementioned related art contain or disclose all the same structures or structural characteristics of the invention.

SUMMARY OF THE INVENTION

The invention creates an apparatus comprising a series of pump/generators with low maintenance, higher flow rates, which are lighter and more compact, without bearings, causing contamination from bearing grease or debris or shafts, and shaft seals that would normally be used in liquid or gas pumps and liquid or gas generators but cause resistance.

The invention, the pump/generator over-unity apparatus and method, is a serial array of electric generator turbine devices, each of which may act as a liquid or gas pump and an electric power generator, by providing magnets in place of conventional bearings, bushings and axles to generate electrical energy while spinning with the turbine as a pump in flow augmenting relation within a recirculating pipeline, whereby one of said generator devices, or another type of pumping device is employed as an at least one pumping means, and the remaining said devices would be used as inline serial array of electrical generators, to create the "over-unity" pump/generator over-unity apparatus. Each of the plurality of pump/generating devices comprises a hollow turbine housing receiving flowing matter (liquid or gas) from a matter source, the housing having an interior side and an exterior side. The turbine housing to the plurality of pump generating devices encloses a freely spinning hollow drive cylinder located within the housing. A heliocoidal impeller is cooperatively engaged within the hollow drive cylinder, within the hollow turbine housing of the plurality of pump/generator devices to give the drive cylinder thrust to spin within the housing.

Ring magnets vertically support the cylindrical liquid or gas helicoidal impeller in a bearing-like manner within each of the plurality of pump/generator devices allowing the cylinder within the impeller to float freely in the pipeline and turbine housing as the impeller spins. Within the plurality of pump/generator devices, the south housing ring magnet is affixed to and ringing the interior side of the turbine housing, and is in repelling and bearing relation to the vertically above south cylinder ring magnet. The south cylinder ring magnet is affixed to and ringing the inner surface of the drive cylinder, and is magnetically repulsed by the south housing ring magnet and pushes away from the opposing south housing ring magnet fixed in the turbine housing and is bearingly, vertically and repulsively supporting the drive cylinder. A north housing ring magnet is affixed to and ringing the interior side of the turbine housing proximal to the matter inlet and below the flared member. The north cylinder ring magnet is in repelling and bearing relation to the north housing ring magnet and is affixed to and ringing the inner surface at the top end of the drive cylinder, and is magnetically repulsed by the north housing ring magnet, and is bearingly, vertically and repulsively containing the drive cylinder. Together these two south and two north ring magnets make, in effect, frictionless thrust bearings as the drive cylinder containing the impeller is placed in motion from the effects of the flowing matter (gas or liquid) on the impeller.

An iron-free serpentined coil group of conventional stator coils winds around and rings the exterior side of the housing, and is used to generate electric current while in lateral support with the magnetic, cylindrical impeller, pump/generator drive cylinder, while the cylinder is supported vertically by the opposing ring magnets. The coil group comprises strands of wire materials: the coils being made of conductive material, generally copper wire, and is fixed or secured to the exterior side of the turbine cylinder housing by a fastening means. A plurality of linear magnets are circumferentially situated and arrayed lengthwise within the drive cylinder proximal to the south cylinder ring magnet and located within radial magnet slots within the drive cylinder. The linear magnets are in laterally, and alternating repelling and supporting relation with the serpentined coil group ringing the turbine housing and opposite the impeller in the drive cylinder. The ring magnets within the drive cylinder concurrently make electricity while the drive cylinder is spinning, as the flowing matter moves through the hollow cylinder. The plurality of pump/generator devices in the apparatus are in serial arrangement and connected by the pressurized recirculating pipeline. An at least one pumping means is connected in an embodiment of the invention in serial arrangement. In another embodiment the pipeline may further comprise a venturi eductor. Another embodiment of the invention is a method of assembling the pump/generator over-unity apparatus for augmenting liquid or gas flow and generating electricity. The method further comprises flowing the flowing matter into the matter inlet through and rotating the helicoidal screw, causing the hollow drive cylinder containing the plurality of linear magnets to spin, thereby generating an electrical current from the coil group by the plurality of linear magnets within the spinning drive cylinder; serially arranging the plurality of pump/generator devices and connecting said devices by a pressurized recirculating pipeline.

Advantages of the invention include a longer lifetime and more efficiency for new uses.

Another advantage of the invention is that the combined use of magnets in the devices of the apparatus, and the design of the iron free serpentine coils, which aid in providing zero points of contact from the moving parts, enabling the invention's operation with minimal resistance and friction. Using magnets in place of traditional bearings and other moving parts creates a low friction environment. Once the device is installed, in sealed pipes, there are no parts to replace, such as: gears, bushings, bearings, axles, belts or chains.

A helical propeller, or helix, or impeller as described below, inside the turbine in one aspect of the invention maximizes the energy produced in a pipeline without restricting the flowing matter, a fluid, a liquid or gas.

Advantages of the embodiments of the present invention include the following:
1. The invention has no bearings to contaminate liquid or gas.
2. The invention has no bearing or seals to fail.
3. The invention has no external motor to drive the impellers, meaning it is more compact than any other pumps.
4. The electric coils of the invention may be fluid cooled through the pump/generator casing in each device.
5. The invention is designed with impellers for moving matter faster while maintaining the same direction of flowing matter movement.
6. Because of the impeller design, the invention can also be run in reverse to change the direction of matter flow in a pipeline.
7. Using the impeller design means that the invention can have flowing matter passed though each device turning the apparatus into an "inline" electrical generator.
8. The inline generator of the embodiment of the present invention can be fit in any pipeline that is fluid, flowing matter, gas or liquid.

Unlike other pumps in the industry, as another advantage of the invention is that it can maintain one directional liquid or gas motion as a high flow pump apparatus, so that a pump can be used as a propulsion device (such as an outboard motor for water sports). The pump can be used as a power aid in small boats, scuba diving power, and remote operated vehicles (such as a submarine).

As another advantage, the invention has the potential to be fixed to a high flowing matter pump in a pressurized recirculating hydraulic system to achieve a "stand alone", generally self-powering device for long periods of time, after initial powering and matter reservoir supply.

Another advantage of the invention is that, unlike most devices in the pump and related industries, this apparatus can be used where non-contamination and reliability is crucial, such as in the medical industry.

As a flowing matter generator, another advantage of the invention is that it can be installed in most pipelines to harness electrical energy. Unlike standard generators found in industry, the generator of the invention has the advantages of being an array of multiple generators, or "devices," in the same pipeline due to the invention's hydraulic free flowing design and minimal resistance and friction.

The foregoing and other objectives, advantages, aspects, and features of the present invention will be more fully understood and appreciated by those skilled in the art upon consideration of the detailed description of a preferred embodiment, presented below in conjunction with the accompanying drawings. The aforementioned features, aspects and advantages of the present invention, and further objectives and advantages of the invention, will become apparent from a consideration of the drawings and ensuing description.

BRIEF DESCRIPTION OF THE SEVERAL VIEWS OF THE DRAWINGS

The foregoing features and other aspects of the present invention are explained and other features and objectives of the present invention will become apparent in the following detailed descriptions, taken in conjunction with the accompanying drawings. However, the drawings are provided for purposes of illustration only, and are not intended as a definition of the limits of the invention.

FIG. 3 illustrates an elevated view of cross section A-A, a view of one of the plurality of pump/generator devices, depicting turbine cylinder enclosing an impeller and ring magnets fixed inside a turbine housing, and showing the direction of matter flow through the invention, and omitting the serpentined coil group.

FIG. 4 illustrates a partial elevated interior view of the turbine housing, from cross section A-A from FIG. 3 omitting the drive cylinder.

FIG. 5 illustrates the elevated view of one of the plurality of pump/generator devices depicting the turbine housing of FIG. 3, having the serpentined coil group on the exterior side, secured on the outside of the turbine housing with a fastening means, and with the interior ends of the turbine housing depicting the plurality of matter straightening vanes.

DETAILED DESCRIPTION OF THE INVENTION

The present invention will now be described more fully hereinafter with references to the accompanying drawings, in which the preferred embodiment of the invention is shown. This invention may, however, be embodied in different forms and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout.

Figure 1:
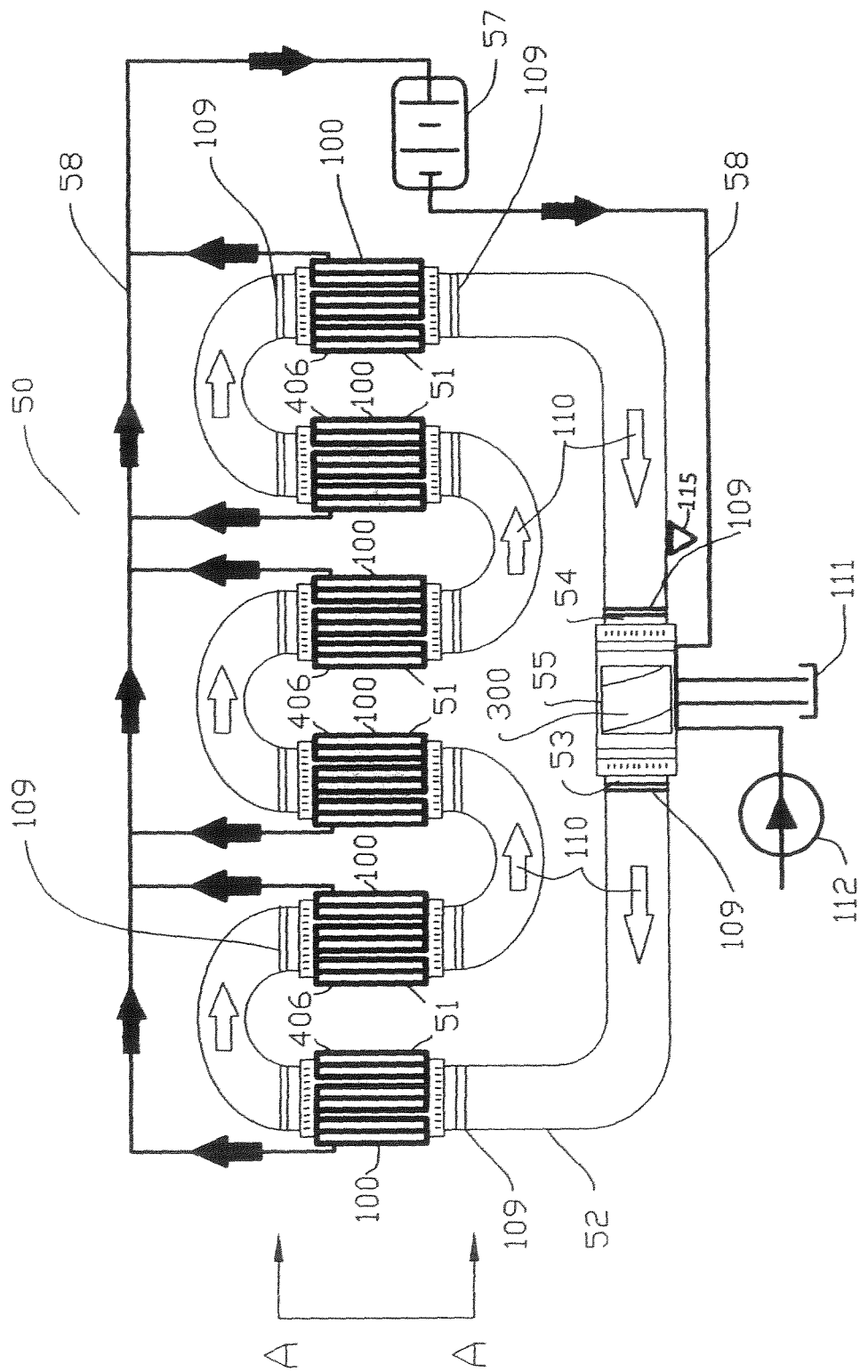
FIG. 1 illustrates a planar view of the preferred embodiment of the present invention, depicting a serial array of a plurality of pump/generator devices connected by a pipeline to an at least one pumping means, wherein a cutout depicting a helicoidal impeller is provided; and indicating cross section A-A, showing the direction of matter flow through the invention; and showing a battery, a matter source or reservoir for the liquid or gas fluid matter and an electrical power source, all as symbols.

The invention, the pump/generator over-unity apparatus and method, is a serial array of electric generator turbine devices, each of which may act as a liquid or gas pump and an electric power generator, by providing magnets in place of conventional bearings, bushings and axles to generate electrical energy while spinning with the turbine as a pump. Turning to FIG. 1, depicting an embodiment of the invention, a plurality of the compact low maintenance pump/generator devices 100 are arrayed or joined together in a serial arrangement 51 as a pump/generator over-unity apparatus 50 in matter flow augmenting relation with a recirculating pipeline 52, for augmenting flowing matter 110 (where the matter is either liquid or gas), whereby one of said pump/generator devices 100, or another type of pumping device is employed as an at least one pumping means 55, and the remaining said pump/generator devices 100 would be used as inline serial array of electrical generators, to create the "over-unity" pump/generator over-unity apparatus 50. Each said pump/generator devices 100 described may be arrayed, in alternative embodiments, as multiple pumps to augment, or enhance, flow or electrical generation in the same pipeline 52, due to the invention's hydraulic free flowing design and minimal resistance and friction. The at least one pumping means 55 may, alternatively be any pump commonly known in the industry to pump liquids or gases.

As depicted in FIGS. 1-5, the pump/generator over-unity apparatus 50 comprises the plurality of pump/generator devices 100 in flow augmenting relation, each of the plurality of pump/generating devices 100 comprising: a hollow turbine housing 101 receiving flowing matter 110 from a matter source 111, the hollow turbine housing 101 having an interior side 107 and an exterior side 108. The flowing matter 110 is fluid, being a gas or liquid. The hollow turbine housing 101 comprises: a matter inlet 102 and an opposing matter outlet 103; a flared member 104 proximal to the matter inlet 102, and a tapered member 105 proximal to the matter outlet 103. The matter inlet 102 and matter outlet 103 are interchangeable, so that the fluid matter, as a gas or liquid such as water, may flow through the plurality of pump/generator devices 100 in either direction. The flowing matter 110 may be a flowing gas, as well, such as air or other gas, or steam. The matter source 111 for the flowing matter 110 may be, for a liquid, a city water system, a commercial or residential piping system, an external flume, or any number of flowing matter 110 or fluid delivery systems. The matter source 111 for a gas, may be a gas vent, a gas duct (such as for a forced air system), pipe or exhaust from an industrial or utility plant, or a gas suction inlet or vacuum. This would include the pump/generator devices 100 utilized in multiple arrays as an embodiment of the invention, in which each pump/generator device 100 would subsequently act as its own source of flowing matter 110, after the matter source 111 provides the initial flowing matter 110.

Figure 12:
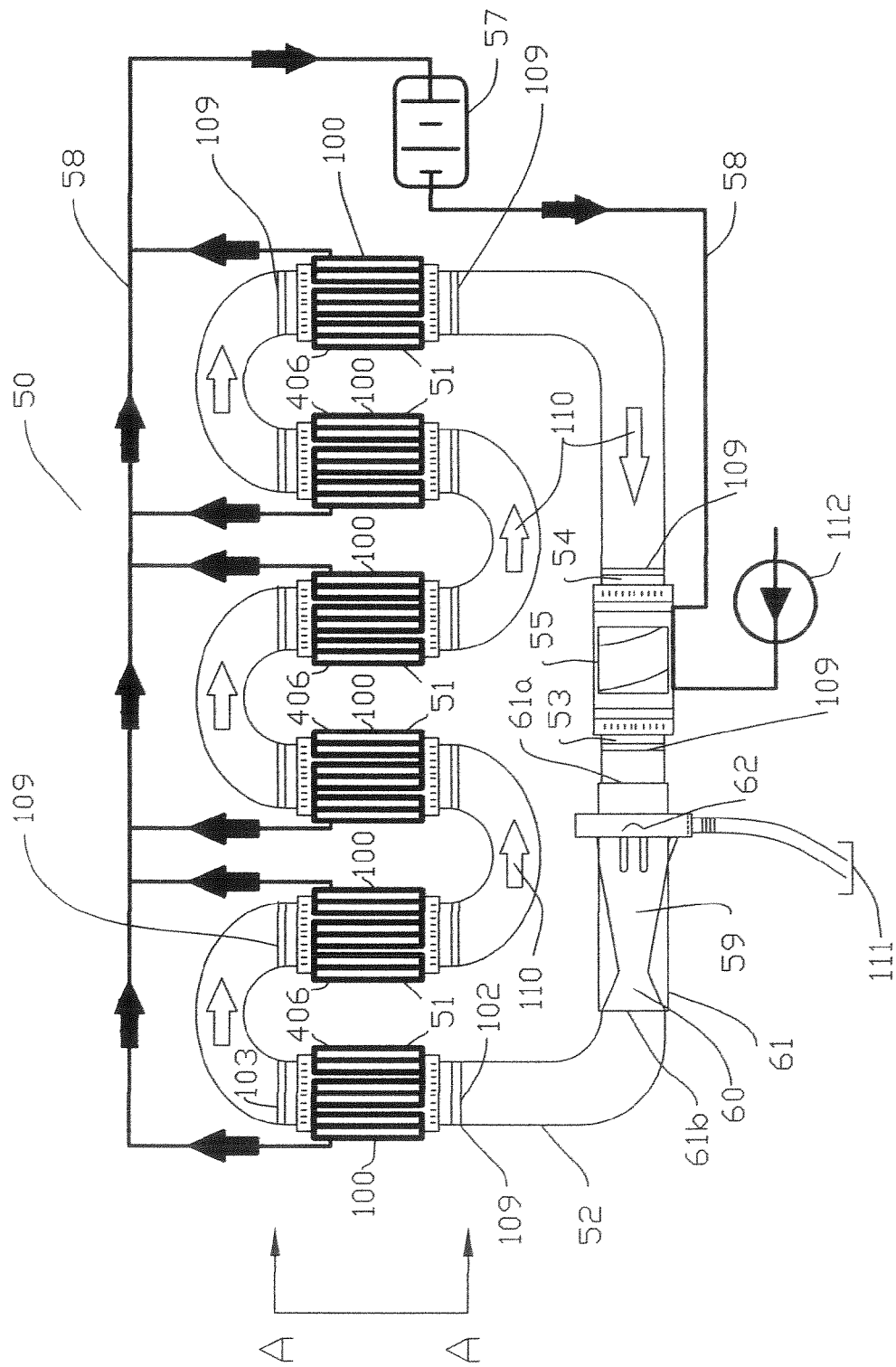
FIG. 12 illustrates the planar view of the invention of FIG. 1, without the reservoir matter source and incorporating a venturi eductor into the pipeline oriented with the matter flow, having a cutout in the venturi tube depicting the nozzle located therein.

In an alternative embodiment, show in FIG. 12, the pipeline 52 may further comprise a venturi eductor 59, or other flow velocity enhancement system found in industry. The use of the eductor 59 allows for an alternative liquid, or motive liquid, matter source 111 through the eductor 59, eliminating the need for a reservoir as the matter source to the pumping means 55. The venturi eductor 59 further comprises an eductor tube 61, a nozzle 60, located within the eductor tube 61 and at least one venturi nozzle 62 attached to the eductor tube 61 at an acute angle in a primary position within the eductor in relation to the flowing matter 110, before the nozzle 60. In this arrangement, the venturi eductor 59 allows for low velocity draw of flowing matter 110 from the matter source 111, which matter 110 is further accelerated again through the nozzle 60 in the venturi eductor 59, which is located in the recirculating pipeline 52.

In another embodiment, where the fluid, a flowing gas, is the flowing matter 110, the apparatus further comprises a gas exhaust 115, shown in FIG. 1, utilized to vent excess gas.

Figure 2:
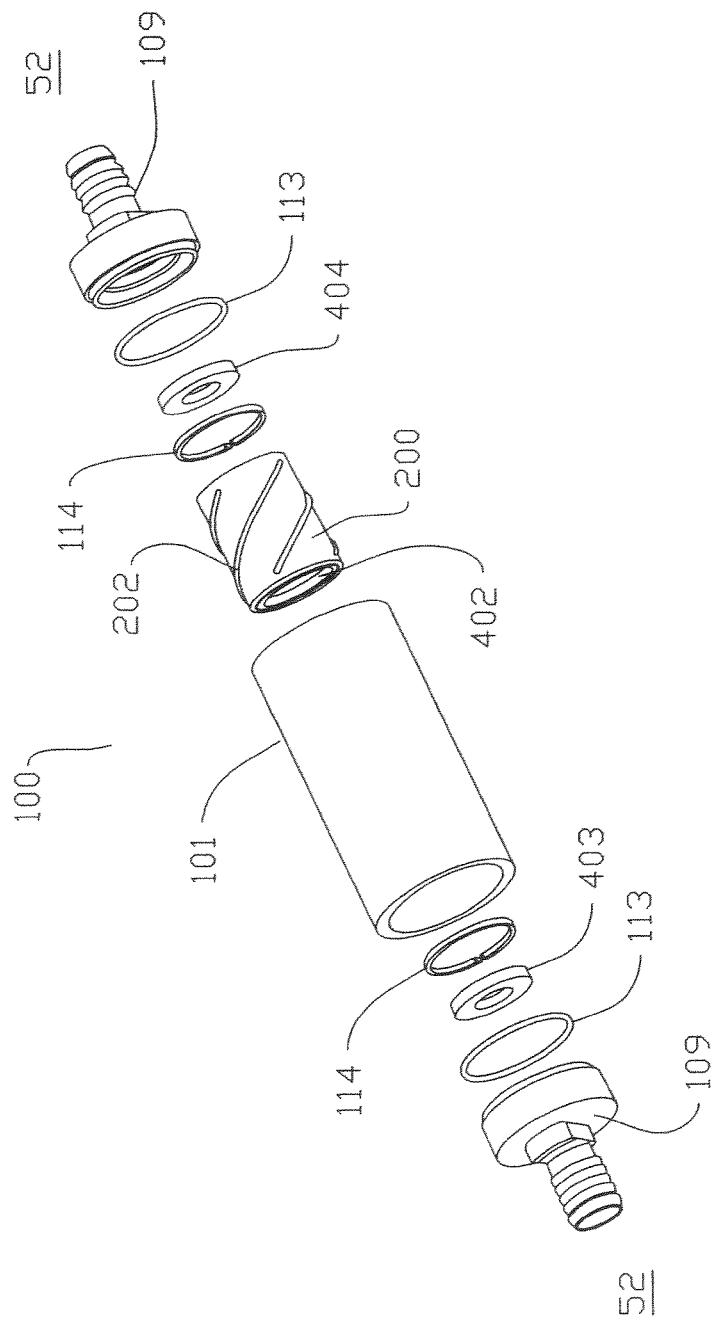
FIG. 2 illustrates an exploded perspective view of one of the plurality of pump/generator devices located in FIG. 1, without the serpentined coil group.

The hollow turbine housing 101, to the plurality of pump generating devices 100 in FIGS. 1-3 of an embodiment of the invention, encloses a freely spinning hollow drive cylinder 200 located within the hollow turbine housing 101 and between and proximal to one of a pair of conical gauss filters 106, the flared member 104 and the tapered member 105. The freely spinning hollow drive cylinder 200 comprises: an outer surface 201, a surficially raised helicoidal spinning vane 202, or flute, an inner surface 203, a top end 205 and an opposite base end 206, as well as a tapered internal wall 204, tapering from the top end 205 toward the inner surface 203. As illustrated in FIGS. 2 and 3, the turbine housing 101, also comprises: a pair of magnet retaining rings 114, located between north and south housing ring magnets 404 and 403, respectively and the flared member and tapered member 104 and 105, respectively. The pair of magnet retaining rings 114 secure the housing ring magnets 404 and 403 within the hollow turbine housing 101. The retaining rings 114 may be made of a resin plastic or a non-magnetic metal.

A plurality of o-rings 113, shown in FIG. 2, are sealingly located or fixed between the hollow turbine housing 101 and a plurality of connecting means 109, sealing the hollow turbine housing 101 connecting with the pipeline 52. The plurality of o-rings 113 act as gaskets or seals, made of rubber or other pliant material. The connecting means 109 may be "hose barbs" or other forms of connectors located at the respective first pump connection 53 and second pump connection 54, as well as other locations along the pipeline 52, as means for fastening or connecting the pipeline 52, as further described below, with the hollow turbine housing 101. The connecting means 109 may also be a flange connection or other fastening means.

Figure 6:
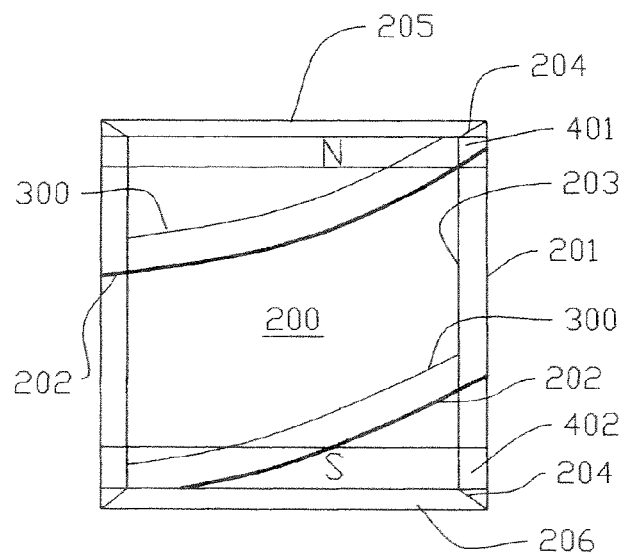
FIG. 6 illustrates a partial elevational interior view of FIG. 3, showing the drive cylinder, depicting the enclosed impeller, and the raised spinning vane on the internal surface of the drive cylinder.
Figure 7:
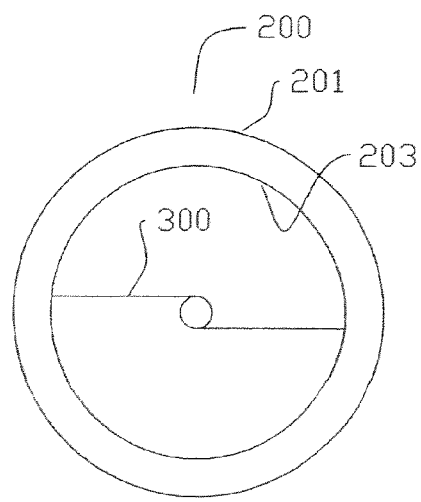
FIG. 7 illustrates a partial top planar view of the drive cylinder enclosing the heliocoidal impeller.

The "helicoidal" elements in the embodiments of the invention pertain to corkscrew-like shapes, helixes, rotors or helicoids located in the freely spinning hollow drive cylinder 200. Shown in FIGS. 2, 3, 6-8, and 9, a helicoidal impeller 300, drive helix, rotor or helia-screw, is cooperatively engaged within the freely spinning hollow drive cylinder 200, within the hollow turbine housing 101 of the plurality of pump/generator devices 100. The embodiment of the invention has a multiple (north-south) freely spinning hollow drive cylinder 200 which is hollow, having a hole through the center, equivalent to the interior diameter of the matter source 111, or the pipe 52, that feeds or sources the flowing matter 110 to the freely spinning hollow drive cylinder 200. As shown in FIGS. 9A, 9B and 6, inside the freely spinning hollow drive cylinder 200, the helicoidal impeller 300, is fixed or engaged to the freely spinning hollow drive cylinder 200 wall to give the freely spinning hollow drive cylinder 200 thrust to spin within the hollow turbine housing 101. The helicoidal impeller 300 and the surficially raised helicoidal spinning vane 202, described below, are equivalently pitched as depicted in FIGS. 3 and 9A to augment each other's spinning thrust.

An embodiment of the invention uses ring magnets 401-404 (respectively, a north cylinder ring magnet 401, a south cylinder ring magnet 402, a south housing ring magnet 403 and a north housing ring magnet 404) (depicted in FIGS. 2 and 3 as north-south (N-S) opposing force magnets) to vertically support the cylindrical helicoidal impeller 300 in a bearing-like manner within each of the plurality of pump/generator devices 100, shown in FIGS. 1, 3, 4, and 6, and used on the top end 205 and base end 206 of the freely spinning hollow drive cylinder 200, shown in FIG. 6, as well as fixed to the inner wall or interior side 107 of the hollow turbine housing 101, shown in FIGS. 3 and 4, allowing the freely spinning hollow drive cylinder 200 within the helicoidal impeller 300 to the pump/generator devices 100 to float freely in the pipeline 52 and hollow turbine housing 101, shown in FIGS. 3 and 4, as the helicoidal impeller 300 spins.

The "north" or "N" designation indicates the opposing magnetic force and the location of the north cylinder ring magnet 401 and the north housing ring magnet 404 vertically opposite the "south" or "S" south cylinder ring magnet 402 and the south housing ring magnet 403 is as generally depicted for magnetic field forces. The north cylinder ring magnet 401 and north housing ring magnet 404, respectively, and the south cylinder ring magnet 402 and the south housing ring magnet 403, respectively, are situated, in FIG. 3, at opposite ends of (or for purposes of locating them here and in the figures), above and below the turbine freely spinning hollow drive cylinder 200, in order for flowing matter 110 to be able to flow in either direction through each of the plurality of pump/generator devices 100.

It is understood that the "north and south" ring magnets to the invention are not required to be elevationally "above" and "below" each other. The "north" and "south" ring magnets can be at the top or bottom, above or below each other, so long as they are opposing magnetic forces at opposite ends. The freely spinning hollow drive cylinder 200 has a relative "north" at one end and a "south" at the other end whereby the north cylinder ring magnet 401, the south cylinder ring magnet 402, the south housing ring magnet 403 and the north housing ring magnet 404 at opposite ends of the freely spinning hollow drive cylinder 200 provide a uniform flux pattern for the freely spinning hollow drive cylinder 200 to rotate evenly when the pump/generator device 100 functions as a pump.

As shown in FIG. 4 within the plurality of pump/generator devices 100, the south housing ring magnet 403 is affixed to and ringing the interior side 107 of the hollow turbine housing 101 proximal to the matter outlet 103 and above the tapered member 105. The south housing ring magnet 403 is in repelling and bearing relation to the vertically above south cylinder ring magnet 402. The south cylinder ring magnet 402 is affixed to and ringing the inner surface 203 at the base end 206 of the freely spinning hollow drive cylinder 200, and is magnetically repulsed by the south housing ring magnet 403. The south cylinder ring magnet 402 pushes away from the opposing south housing ring magnet 403 fixed in the hollow turbine housing 101. The south cylinder ring magnet 402, in turn, is bearingly, vertically and repulsively supporting the freely spinning hollow drive cylinder 200. Together these two south ring magnets, the south cylinder ring magnet 402 and the south housing ring magnet 403 make, in effect, a frictionless thrust bearing as the freely spinning hollow drive cylinder 200 containing the helicoidal impeller 300 is placed in motion from the effects of the flowing matter 110 on the helicoidal impeller 300.

As shown in FIG. 4, the north housing ring magnet 404 is affixed to and ringing the interior side 107 of the hollow turbine housing 101 proximal to the matter inlet 102 and below the flared member 104. The north cylinder ring magnet 401 is in repelling and bearing relation to the north housing ring magnet 404 as shown in FIG. 3. The north cylinder ring magnet 401 is affixed to and ringing the inner surface 203 at the top end 205 of the freely spinning hollow drive cylinder 200, and is magnetically repulsed by the north housing ring magnet 404. The north cylinder ring magnet 401 pushes away from the opposing north housing ring magnet 404 fixed in the hollow turbine housing 101. The north cylinder ring magnet 401, in turn, is bearingly, vertically and repulsively containing the free spinning hollow drive cylinder 200. Together north cylinder ring magnet 401 and the north housing ring magnet 404 make, in effect, a frictionless thrust bearing as the freely spinning hollow dive cylinder 200 containing the helicoidal impeller 300 is placed in motion from the effects of the flowing matter 110 on the helicoidal impeller 300.

An embodiment of the invention, as shown in FIGS. 1 and 5, comprises an iron-free serpentined, or snake-like form, strand or coil group 406, of conventional stator coils, winding around and ringing the exterior side 108 of the hollow turbine housing 101, to the plurality of the pump/generator devices 100. The iron-free serpentined coil group 406 is used to generate electric current while in lateral support with the magnetic, cylindrical liquid or gas/impeller, pump/generator freely spinning hollow drive cylinder 200, while the freely spinning hollow drive cylinder 200 is supported vertically by the opposing ring magnets (the north cylinder ring magnet 401, the south cylinder ring magnet 402, the south housing ring magnet 403 and the north housing ring magnet 404) at the base end 206 and top end 205 respectively, as described above and shown in FIGS. 2-3.

The iron-free serpentined coil group 406 comprises strands of wire materials: the coils being made of conductive material, generally copper wire, and depicted in FIGS. 1 and 5. The wire size and configuration of the coils in the iron-free serpentined coil group 406 are variable depending on the exact application of an embodiment of the invention. The iron-free serpentined coil group 406 is fixed or secured to the exterior side 108 of the hollow turbine housing 101 by a fastening means 407 shown as a series of restraining clips in FIG. 5. The fastening means 407 may be clips, ties or other fastening means. If the hollow turbine housing 101 is made of plastics or resins, the coils to the iron-free serpentined coil group 406 can be molded into the exterior side 108 of the hollow turbine housing 101, as a fastening means 407.

Figures 9A, 9B:
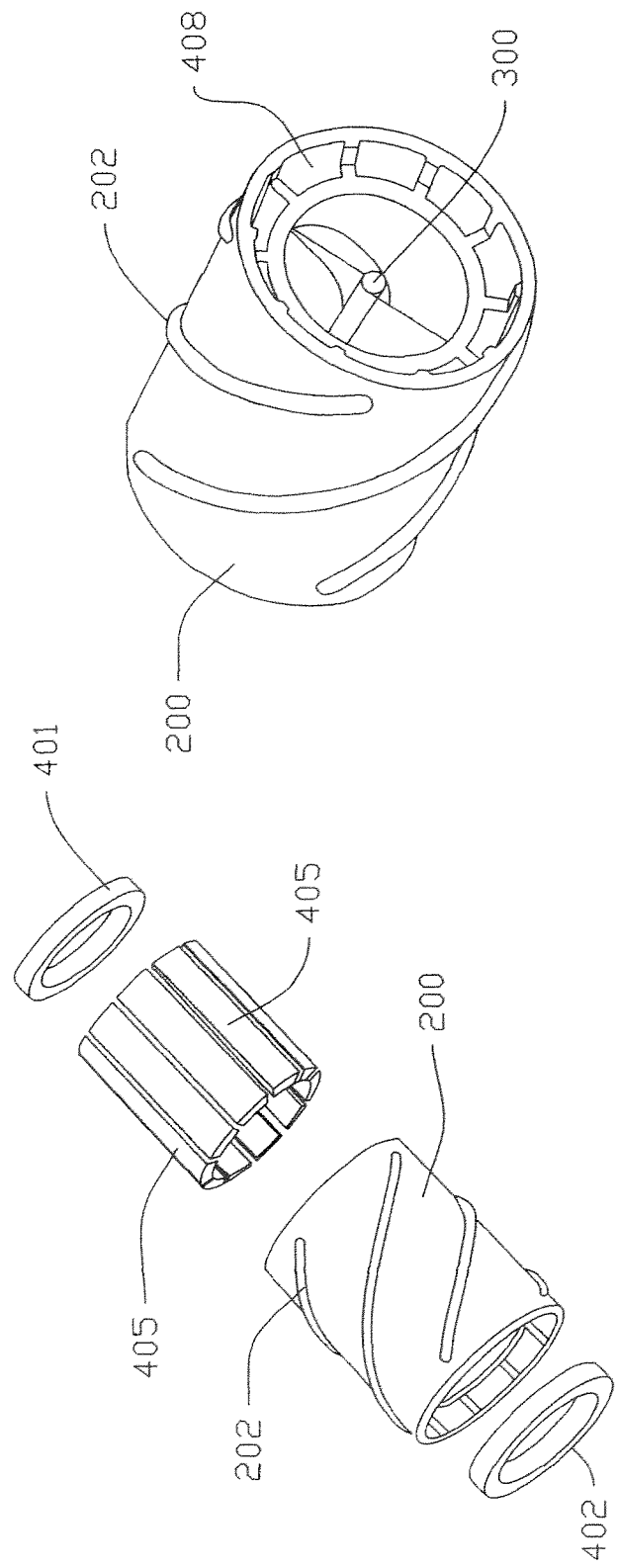
FIG. 9A illustrates an exploded perspective view of the drive cylinder, without the impeller.
FIG. 9B illustrates a partial perspective view, depicting the drive cylinder having radial magnet slots to contain the linear magnets, as extracted from FIG. 9A in this view.
Figure 11:
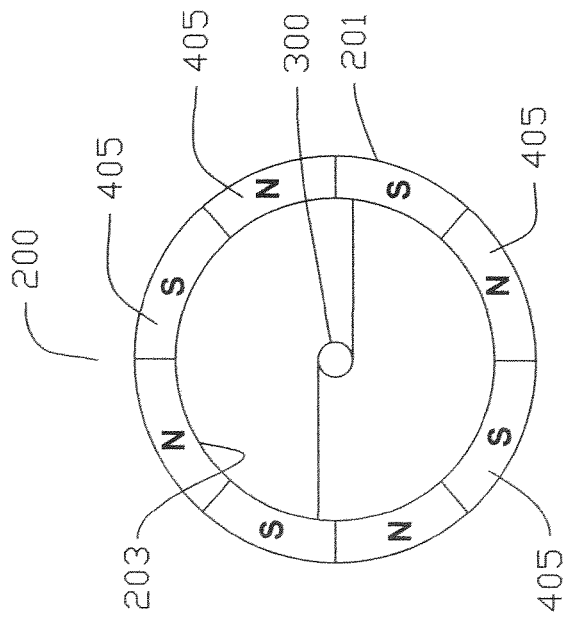
FIG. 11 illustrates a partial top planar view of the drive cylinder enclosing the impeller and the plurality of linear magnets arrayed and imbedded inside the cylinder wall.
Figure 10:
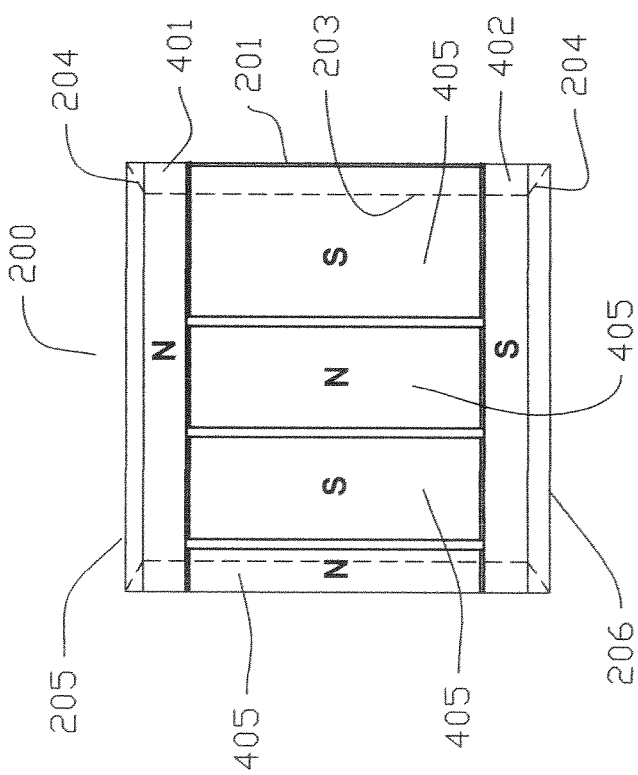
FIG. 10 illustrates a partial elevated interior view depicting the drive cylinder encompassing a plurality of linear magnets circumferentially arrayed according to their electromagnetic polar charges as labeled (N-S), inside the cylinder wall.

In an embodiment of the invention, shown in FIGS. 10 and 11, are a plurality of linear magnets 405 circumferentially situated and arrayed lengthwise within the freely spinning hollow drive cylinder 200, from the tapered internal wall 204 proximally to the south cylinder ring magnet 402. The linear magnets 405 are installed, contained, and located within radial magnet slots 408, shown in FIGS. 9A and 9B, within the freely spinning hollow drive cylinder 200, or otherwise imbedded within the internal wall 204 of the freely spinning hollow cylinder 200, as shown in FIGS. 10 and 11. As shown in FIGS. 10 and 11, the linear magnets 405 are arrayed in and comprised of alternating N-S (or (+) and (−)) linear magnets in alternating and repelling relationship to each other. As well, the linear magnets 405 are in laterally, and alternating repelling and supporting relation with the iron-free serpentined coil group 406 ringing the hollow turbine housing 101 and opposite the helicoidal impeller 300 in the freely spinning hollow drive cylinder 200. As depicted in FIG. 5, in an embodiment of the invention, the iron-free serpentined coil group 406 is designed so that it is always situated opposite one of the linear magnets 405 within the freely spinning hollow drive cylinder 200 maintaining, in a symmetrical manner, its position or point around the freely spinning hollow cylinder 200 circumference.

The north cylinder ring magnet 401, the south cylinder ring magnet 402, the south housing ring magnet 403, and the north housing ring magnet 404 at the top and bottom of each of the plurality of cylindrical impeller, pump/generator devices 100, shown in FIGS. 3 and 4, are used to support the freely spinning hollow cylinder 200 and helicoidal impeller 300 vertically, while the plurality of linear magnets 405 arranged within the freely spinning hollow drive cylinder 200, shown in FIGS. 10 and 11, are used to support the freely spinning hollow drive cylinder 200 laterally by repelling forces from the iron-free serpentined coil group 406. The north cylinder ring magnet 401, the south cylinder ring magnet 402, the south housing ring magnet 403, and the north housing ring magnet 404 within the freely spinning hollow drive cylinder 200 concurrently make electricity while the freely spinning hollow drive cylinder 200 is spinning, as the flowing matter 110 moves through the freely spinning hollow drive cylinder 200.

The freely spinning hollow drive cylinder 200 and the hollow turbine housing 101 may be made of a resin plastic or a non-magnetic stainless metal. The north cylinder ring magnet 401, the south cylinder ring magnet 402, the south housing ring magnet 403, and the north housing ring magnet 404 and the plurality of linear magnets 405, respectively, may be made of magnetic ferrous material common in the industry or of high powered neodymium, or other rare earth materials, commonly used in the production of magnets.

In an embodiment of the invention, the iron-free serpentined coil group 406 repels and attracts an equal amount of (negative or north) pole linear magnets 405 and (south or positive) pole linear magnets 405 situated within the freely spinning hollow drive cylinder 200, constantly keeping the freely spinning hollow drive cylinder 200 correctly aligned within the hollow turbine housing 101, rotating and producing electricity, to continue in the direction of rotation, and providing a magnetic propulsion and centralization of the freely spinning hollow drive cylinder 200 within the hollow turbine housing 101. The iron-free serpentined coil group 406 can be used simultaneously as generator coils as an inline matter or fluid generator device and propulsion coils for an inline matter or fluid pump.

The freely spinning hollow drive cylinder 200 is always "hovering" or suspended inside the pump/generator devices 100, the north cylinder ring magnet 401, the south cylinder ring magnet 402, the south housing ring magnet 403, and the north housing ring magnet 404 stopping the freely spinning hollow drive cylinder 200 from falling away from the coils, to the iron-free serpentined coil group 406 when matter flow 110 is low or cut. The moving part of each of the pump/generator devices 100 (freely spinning hollow drive cylinder 200) inside the hollow turbine housing 101 is supported frictionless, vertically by the opposing north cylinder ring magnet 401, the south cylinder ring magnet 402, the south housing ring magnet 403 and the north housing ring magnet 404, situated at both ends, as previously identified, of the freely spinning hollow drive cylinder 200, and at both ends of the hollow turbine housing 101 to counteract against any generated vertical matter propulsion. The serpentined coils to the iron-free serpentined coil group 406 also keep the freely spinning hollow drive cylinder 200 supported laterally by being equidistant from the linear magnets 405, from the points noted above around the circumference of the freely spinning hollow drive cylinder 200, keeping the freely spinning hollow drive cylinder 200 from causing friction on the interior side 107 of the hollow turbine housing 101.

By an embodiment of the invention having the design of the helicoidal impeller 300, the plurality of the pump/generator devices 100, as elements of the compact and low maintenance pump/generator over-unity apparatus 50, can have flowing matter 110 pass though each of them, turning each of said pump/generator devices 100 into an inline generator, as depicted in FIGS. 1 and 12. The use of the helicoidal impeller 300 fixed inside the freely spinning hollow drive cylinder 200 shown in FIG. 2 allows each of the plurality of pump/generator devices 100 to maintain the same direction of flowing matter 110. The "inline" designation indicates that in this embodiment of the invention, the plurality of pump/generator devices 100 may be arrayed in the serial arrangement 51, or inline, within a pressurized recirculating pipeline 52 as the apparatus, as shown in FIG. 1. The inline generator plurality of said pump/generator devices 100 can be fit in any pipeline 52 that is flowing matter 110.

As depicted in FIG. 5, with the stator, or stationary element, the iron-free serpentined coil group 406 attached to the exterior side 108 of the hollow turbine housing 101 in each of the plurality of pump/generator devices 100, a magnetic field from the north cylinder ring magnet 401, the south cylinder ring magnet 402, the south housing ring magnet 403 and the north housing ring magnet 404, and the linear magnets 405, respectively (shown in FIGS. 3-10) flows through the freely spinning hollow drive cylinder 200 and produces electrical energy, which can be used to charge a battery 57, as depicted in FIG. 1, to provide continued power for the operation of the pump/generator over-unity apparatus 50, or advanced to an outside power grid to save on energy costs and usage in an alternative embodiment. The iron-free serpentined coil group 406, thereby, both, enhances the use of the north cylinder ring magnet 401, the south cylinder ring magnet 402, the south housing ring magnet 403 and the north housing ring magnet 404, and the linear magnets 405, respectively, as bearings, and facilitates the supplemental energy generated by the magnetic structures iii the plurality of pump/generator devices 100.

In an embodiment of the invention shown in FIGS. 1 and 2, the surficially raised helicoidal spinning vane 202 is in contact inhibiting relation between the hollow turbine housing 101 and the freely spinning hollow drive cylinder 200. This surficially raised helicoidal spinning vane 202 on the outer surface 201 of the freely spinning hollow drive cylinder 200 helps spin the freely spinning hollow drive cylinder 200. As noted, the surficially raised helicoidal spinning vane 202 is pitched at the same angle as the helicoidal or helix screw or helicoidal impeller 300. The surficially raised helicoidal spinning vane 202 around the exterior side 108 of the freely spinning hollow drive cylinder 200 aids in producing an outward direction and thrust of flowing matter 110 to stop the freely spinning hollow drive cylinder 200 from coming into contact with hollow turbine housing 101.

In another embodiment of the invention, shown in FIGS. 3 and 4, the hollow turbine housing 101 further comprises: a pair of gauss cone filters 106 are fixedly attached to the interior side 107 of the hollow turbine housing 101 adjacent to the flared member 104 and to the tapered member 105, respectively. The pair of gauss cone filters 106 are provided to stop debris going between the freely spinning hollow drive cylinder 200 and the hollow turbine housing 101, creating distilled flowing matter 110 moving through the closed system of the pump/generator over-unity apparatus 50, as shown in FIGS. 1 and 12.

As shown in FIGS. 3 and 4, in an embodiment of the invention, the hollow turbine housing 101 further comprises a plurality of matter straightening vanes 207 set within the interior 107 of the flared member 104 and the tapered member 105 of the hollow turbine housing 101. Matter straightening vanes 207 within the interior side 107 of the tapered member 105 and flared member 104 internal walls allow for better flowing matter 110. The matter straightening vanes 207 in front of the freely spinning hollow drive cylinder 200, toward the matter inlet 102, aid smoother running of the helicoidal impeller 300.

Figure 8:
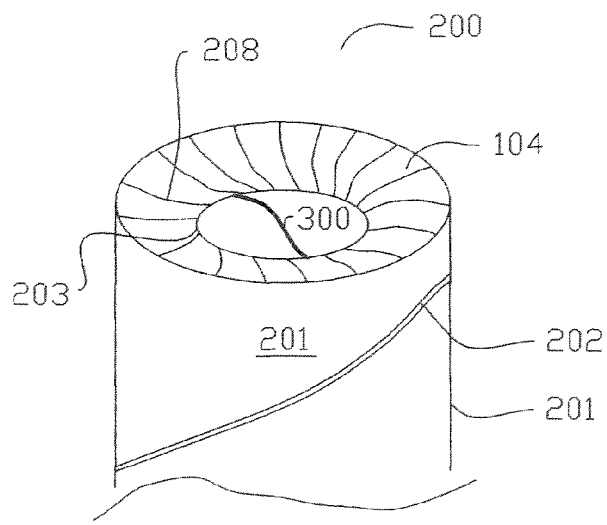
FIG. 8 illustrates a partial perspective view of the drive cylinder, depicting the raised spinning vane and a plurality of thrust vanes.

In another embodiment of the invention, shown in FIG. 8, the freely spinning hollow drive cylinder 200 further comprises a plurality of thrust vanes 208 set at an angle within the tapered internal wall 204 of the freely spinning hollow drive cylinder 200. Part of the hollow turbine housing 101, as depicted in FIG. 8, are the plurality of thrust vanes 208 that help spin the freely spinning hollow drive cylinder 200. The thrust vanes 208 are in the same pitch as the helix screw, the helicoidal impeller 300, on the inside. The thrust vanes 208 are added to the tapered internal wall 204, inside the entrance of the freely spinning hollow drive cylinder 200 for greater thrust and angled for extra thrust to assist the spinning of the pump/generator devices 100.

In an embodiment of the invention, the matter inlet 102 and matter outlet 103 are interchangeable. The electrical generating and reverse matter flow 110 capacities of the pump/generator devices 100 may occur with the matter source 111 being provided in either direction or end of the hollow turbine housing 101.

The freely spinning hollow drive cylinder 200 and hollow turbine housing 101 are made of rigid materials, such as plastic resins or other non-ferrous non-magnetic materials. The three phase iron-free serpentined coil group 406 coils are composed of copper wiring, or other conductive wiring, and the north cylinder ring magnet 401, the south cylinder ring magnet 402, the south housing ring magnet 403, and the north housing ring magnet 404 and the linear magnets 405 are composed of non-permanent magnetic, ferrous metal.

The embodiment of the invention (FIGS. 1-12), in operation therefore, is a plurality of pump/generator devices 100 that can be used as both pumps and as electrical generators comprised of the hollow turbine housing 101 containing the freely spinning hollow drive cylinder 200. On the exterior 108 of the hollow turbine housing 101 is a set of iron-free serpentined coils in the iron-free serpentined coil group 406 that are designed in such a way that they are constantly pulsing in equal points around the circumference of the freely spinning hollow drive cylinder 200 inside the hollow turbine housing 101. These iron-free serpentined coils 406 give the freely spinning hollow drive cylinder 200 a direction of rotation as well as lateral stability. The freely spinning hollow drive cylinder 200, as noted, is comprised of multiple magnets around the outer edge (alternatingly, north and south) in alternating order that are used with the iron-free serpentined coils 406 to give rotation and stability to the pump/generator devices 100. On both ends of the freely spinning hollow drive cylinder 200 are the north cylinder ring magnet 401, the south cylinder ring magnet 402, the south housing ring magnet 403 and the north housing ring magnet 404 (one end must have north magnet facing outwards and the other end must have south magnets facing outwards, or the magnetic flux will not be balanced. These magnets face the same poles as the ring magnets fixed inside the hollow turbine housing 101 at both ends giving the freely spinning hollow drive cylinder 200 vertical repulsion from top and bottom.

The freely spinning hollow drive cylinder 200 has a fixed helicoidal impeller 300 inside, used for moving liquid or gas if the pump/generator devices 100 are used as a pump or used to harness moving liquid or gas energy and turning it in to rotational energy if the pump/generator devices 100 are used as generators. On the outside of the freely spinning hollow drive cylinder 200, again, is the surficially raised helicoidal spinning vane 202 that follows the pitch of the helicoidal impeller 300 that also moves flowing matter 110 or harnesses energy. The surficially raised helicoidal spinning vane 202 also creates a high outwards liquid or gas pressure against the housing wall as liquid or gas forces over them as the freely spinning hollow drive cylinder 200 spins at high speed causing the liquid or gas cushion between the freely spinning hollow drive cylinder 200 and hollow turbine housing 101, preventing friction. The hollow turbine housing 101 and freely spinning hollow drive cylinder 200 can be made from plastic resins or non-magnetic metals.

The iron-free serpentined coil group 406 is in alternating electrical current generating and rotational relation with the plurality of linear magnets 405. The north housing ring magnet 404 and the south housing ring magnet 403 repel the north cylinder ring magnet 401 and the south cylinder ring magnet 402 and secure in place the freely spinning hollow drive cylinder 200 within the hollow turbine housing 101. The flowing matter 110 flows into the matter inlet 102 and through the freely spinning hollow drive cylinder 200 and rotates the helicoidal impeller 300, causing the freely spinning hollow drive cylinder 200 containing the plurality of linear magnets 405 to spin; whereby the plurality of linear magnets 405 within the freely spinning hollow drive cylinder 200 generate an electrical current 58 in the iron-free serpentined coil group 406.

The plurality of pump/generator devices 100 in the pump/generator over-unity apparatus 50, in FIG. 1, are in serial arrangement 51 and connected by the pressurized recirculating pipeline 52, which comprises a first pump connection 53, a second pump connection 54, and the plurality of connecting means 109 for connecting to the pipeline 52. The at least one pumping means 55 is connected in an embodiment of the invention in serial arrangement 51, as shown in FIGS. 1 and 12, between the first pump connection 53 and the second pump connection 54. In another embodiment, illustrated in FIG. 12, the pipeline 52 may further comprise the venturi eductor 59, having the eductor tube 61 having an eductor inlet 61a and an eductor outlet 61b, the nozzle 60 located within the eductor tube 61 proximal to the eductor outlet 61b, and at the least one venturi nozzle 62 proximal to the eductor inlet 61a. The plurality of connecting means 109, shown in FIG. 1, facilitate the pipeline 52 connection with the least one pumping means 55, the plurality of pump/generator devices 100, and the venturi eductor 59. The pump/generator devices 100 may, alternatively, be configured in parallel, and/or arranged vertically or horizontally. The number of pump/generator devices 100 utilized may be any number as is required by the specific location.

As shown in FIG. 1, the at least one pimping means 55, a pump device, further comprises: an electrical power source 112, provides the matter source 111 and initiates the flowing matter 110 to flow within the pipeline 52. As illustrated in FIG. 1, the at least one pumping means 55 may be one of the plurality of pump/generator devices 100 with the iron-free serpentined coil group 406, or another pump device known in the industry.

A method of assembling the pump/generator over-unity apparatus 50, illustrated in FIGS. 1-12, for augmenting flowing matter 110 and generating electricity, may be as follows: arraying a plurality of pump/generator devices 100 in matter flow augmenting relation to each other. The method for each of the plurality pump/generator devices 100 further comprises, as illustrated in FIGS. 2-5, receiving a flowing matter 110 from a matter source 111 in a hollow turbine housing 101, the hollow turbine housing 101 having a interior side 107 and an exterior side 108. The hollow turbine housing 101 comprises: a matter inlet 102 and an opposing matter outlet 103; a flared member 104 which is proximal to the matter inlet 102, and a tapered member 105, which is proximal to the matter outlet 103. This method for each of the pump/generator devices 100 further comprises, as shown in FIGS. 2-5, enclosing a freely spinning hollow drive cylinder 200 within the hollow turbine housing 101 and between and proximal to the flared member 104 and the tapered member 105. The freely spinning hollow drive cylinder 200 comprises: an outer surface 201, a surficially raised helicoidal spinning vane 202 on the outer surface 201, an inner surface 203, a top end 205 and an opposite base end 206, a tapered internal wall 204, tapering from the top end 205 toward the inner surface 203. The method for each of the pump/generator devices 100 further comprises: cooperatively engaging a helicoidal impeller 300 within the freely spinning hollow drive cylinder 200, the helicoidal impeller 300 and the surficially raised helicoidal spinning vane 202 being equivalently pitched.

The method of assembling the pump/generator over-unity apparatus 50, illustrated in FIGS. 2-9, for each of the plurality pump/generator devices 100 further comprises, as illustrated in FIGS. 2-5, affixing and ringing a south cylinder ring magnet 402 to the inner surface 203 at the base end 206 of the freely spinning hollow drive cylinder 200, bearingly and vertically repulsively supporting the immediately adjacent freely spinning hollow drive cylinder 200; affixing and ringing a south housing ring magnet 403 to the interior side 107 of the hollow turbine housing 101, which is proximal to the matter outlet 103 and above the tapered member 105, repellingly and bearingly relating the south housing ring magnet 403 to the south cylinder ring magnet 402; affixing and ringing a north cylinder ring magnet 401 to the inner surface 203 at the top end 205 of the freely spinning hollow drive cylinder 200, bearingly and vertically repulsively containing the immediate adjacent freely spinning hollow drive cylinder 200; and affixing and ringing a north housing ring magnet 404 to the interior side 107 of the hollow turbine housing 101, which is proximal to the matter inlet 102 and below the flared member 104, repellingly and bearingly relating the north housing ring magnet 404 to the north cylinder ring magnet 401. The method further comprises, as illustrated by FIG. 5, winding an iron-free serpentined, in snake-like fashion, coil group 406 along the exterior side 108 of the hollow turbine housing 101 and securing the iron-free serpentined coil group 406 to the hollow turbine housing 101 by a fastening means 407, as described above.

As shown in FIGS. 9-11, the method further comprises: circumferentially arraying a plurality of linear magnets 405 lengthwise from the tapered internal wall 204 proximally to the south cylinder ring magnet 402 within the freely spinning hollow drive cylinder 200, in laterally, and alternating repelling and supporting relation with the iron-free serpentined coil group 406 opposite the helicoidal impeller 300 in the freely spinning hollow drive cylinder 200; locating the iron-free serpentined coil group 406 in alternating electrical current generating and rotational relation with the plurality of linear magnets 405; repelling the north cylinder ring magnet 401 and the south cylinder ring magnet 402 with the south housing ring magnets 403 and the north housing ring magnet 404 and securing in place by the freely spinning hollow drive cylinder 200 within the hollow turbine housing 101.

As shown in FIGS. 1, 3, 5, 11 and 12, the method further comprises flowing the flowing matter 110 into the matter inlet 102 through and rotating the helicoidal impeller 300, causing the freely spinning hollow drive cylinder 200 containing the plurality of linear magnets 405 to spin, thereby generating an electrical current 58 from the iron-free serpentined coil group 406 by the plurality of linear magnets 405 within the freely spinning hollow drive cylinder 200; serially arranging the plurality of pump/generator devices 100 and connecting said pump/generator devices 100 by a pressurized recirculating pipeline 52, said pipeline 52 comprising a first pump connection 53 and an opposite second pump 54 connection; and having at least one pumping means 55 being connected to the serial arrangement 51 between the first pump connection 53 and second pump connection 55.

Alternative embodiments of the method of assembling the pump/generator over-unity apparatus 50, illustrated in FIGS. 1-12, in matter flow augmenting relation, for augmenting flowing matter 110 (gas or liquid) and generating electricity may include the following:

(a) wherein the freely spinning hollow drive cylinder 200 further comprises: a surficially raised helicoidal spinning vane 202 pitched along the outside surface 201, the surficially raised helicoidal spinning vane 202 being equivalently pitched as the helicoidal impeller 300 and in contact inhibiting relation between the hollow turbine housing 101 and the freely spinning hollow drive cylinder 200;

(b) wherein the hollow turbine housing 101 further comprises: a pair of gauss cone filters 106 fixedly attached to the interior side 107 of the hollow turbine housing 101 adjacent to the flared member 104 and to the tapered member 105, respectively;

(c) wherein the hollow turbine housing 101 further comprises: a plurality of matter straightening vanes 207 set within the interior side 107 of the flared member 104 and the tapered member 105 of the hollow turbine housing 101;

(d) wherein the freely spinning hollow drive cylinder 200 further comprises: a plurality of thrust vanes 208 angularly set within the tapered internal wall 204 of the freely spinning hollow drive cylinder 200;

(e) wherein the matter inlet 102 and matter outlet 103 are interchangeable;

(f) wherein the iron-free serpentined coil group 406 is made of copper wire; and (g) wherein the pressurized recirculating pipeline 52 further comprises: a venturi eductor 59 comprising: an eductor tube 61 having an eductor inlet 61a and eductor outlet 61b, a nozzle 60 located within the eductor tube 61 proximal to the eductor outlet 61b and at least one venturi nozzle 62 proximal to the eductor inlet 61a.

Having thus described in detail a preferred selection of embodiments of the present invention, it is to be appreciated, and will be apparent to those skilled in the art, that many physical changes could be made in the device without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention and device, therefore, should not be restricted, except in the following claims and their equivalents.

We claim:

1. A pump/generator over-unity apparatus, said apparatus comprising:
   (a) a plurality of pump/generator devices said plurality of pump/generator devices in matter flow augmenting relation, each of the plurality of pump/generator devices further comprising:
      (i) a hollow turbine housing receiving a flowing matter from a matter source, the hollow turbine housing having an interior side and an exterior side, the hollow turbine housing comprising: a matter inlet and an opposing matter outlet; a flared member proximal to the matter inlet, and a tapered member proximal to the opposing matter outlet;
      (ii) the hollow turbine housing enclosing a freely spinning hollow drive cylinder located within the hollow turbine housing and between and proximal to the flared member and the tapered member;
      (iii) the freely spinning hollow drive cylinder comprising: an outer surface, a surficially raised helicoidal spinning vane, an inner surface, a top end and an opposite base end, a tapered internal wall, tapering from the top end toward the inner surface;
      (iv) a helicoidal impeller cooperatively engaged within the freely spinning hollow drive cylinder, the helicoidal impeller and the surficially raised helicoidal spinning vane being equivalently pitched;
      (v) a south cylinder ring magnet affixed to and ringing the inner surface at the base end of the freely spinning hollow drive cylinder, the south cylinder magnet vertically repulsively supporting the immediately adjacent freely spinning hollow drive cylinder;

(vi) a south housing ring magnet affixed to and ringing the interior side of the hollow turbine housing proximal to the opposing matter outlet and above the tapered member, the south housing ring magnet in repelling and bearing relation to the south cylinder ring magnet;

(vii) a north cylinder ring magnet affixed to and ringing the inner surface at the top end of the freely spinning hollow drive cylinder, the north cylinder ring magnet vertically repulsively containing the immediately adjacent freely spinning hollow drive cylinder;

(viii) a north housing ring magnet affixed to and ringing the interior side of the hollow turbine housing proximal to the matter inlet and below the flared member, the north housing ring magnet in repelling and bearing relation to the north cylinder ring magnet;

(ix) a pair of magnet retaining rings located between north and south housing ring magnets and the flared member and tapered member, respectively;

(x) an iron-free serpentined coil group winding along the exterior side of the hollow turbine housing and secured to the hollow turbine housing by a fastening means;

(xi) a plurality of linear magnets circumferentially arrayed lengthwise from the tapered internal wall proximally to the south cylinder ring magnet within the freely spinning hollow drive cylinder, in laterally, and alternating repelling and supporting relation with the iron-free serpentined coil group opposite of the helicoidal impeller in the freely spinning hollow drive cylinder;

(xii) the iron-free serpentine coil group being in alternating electrical current generating and rotational relation with the plurality of linear magnets;

(xiii) a plurality of o-rings sealingly located between the hollow turbine housing and a plurality of means;

(xiv) the housing ring magnets repelling the cylinder ring magnets and securing in place the freely spinning hollow drive cylinder within the hollow turbine housing;

(xv) the flowing matter flowing into the matter inlet through and rotating the helicoidal impeller, causing the freely spinning hollow drive cylinder containing the plurality of linear magnets to spin; and (xvi) whereby the plurality of linear magnets within the freely spinning hollow drive cylinder generate an electrical current in the iron-free serpentined coil group;

(b) the plurality of pump/generator devices being in a serial arrangement and connected by a pressurized recirculating pipeline, said pipeline comprising a first pump connection, an opposite second pump connection and a plurality of connecting means connecting the plurality of pump/generator devices to the pipeline; and (c) at least one pumping means being connected to the serial arrangement between the first pump connection and opposite second pump connection.

2. The apparatus according to claim 1, wherein said flowing matter comprises: a flowing liquid.

3. The apparatus according to claim 1, wherein the freely spinning hollow drive cylinder further comprises: the surficially raised helicoidal spinning vane pitched along the outer surface, the surficially raised helicoidal spinning vane being equivalently pitched as the helicoidal impeller and in contact inhibiting relation between the hollow turbine housing and the freely spinning hollow drive cylinder.

4. The apparatus according to claim 1, wherein the hollow turbine housing further comprises: a pair of gauss cone filters fixedly attached to the interior side of the hollow turbine housing adjacent to the flared member and to the tapered member, respectively.

5. The apparatus according to claim 1, wherein the hollow turbine housing further comprises: a plurality of matter straightening vanes set within the interior side of the flared member and the tapered member of the hollow turbine housing.

6. The apparatus according to claim 1, wherein the freely spinning hollow drive cylinder further comprises: a plurality of thrust vanes angularly set within the tapered internal wall of the freely spinning hollow drive cylinder.

7. The apparatus according to claim 1, wherein the matter inlet and the opposing matter outlet are interchangeable.

8. The apparatus according to claim 1, wherein the iron-free serpentined coil group is made of copper wire.

9. The apparatus according to claim 1, wherein the pipeline further comprising a venturi eductor comprising: an eductor tube having an eductor inlet and an eductor outlet, a nozzle located within the eductor tube proximal to the eductor outlet and at least one venturi nozzle proximal to the eductor inlet.

10. The apparatus according to claim 1, wherein said flowing matter comprises: a flowing gas; and said apparatus further comprises: a gas exhaust.

11. A pump/generator device, said device comprising:

(a) a hollow turbine housing receiving a flowing matter from a matter source, the hollow turbine housing having an interior side and an exterior side, the hollow turbine housing comprising: a matter inlet and an opposing matter outlet; a flared member proximal to the matter inlet, and a tapered member proximal to the opposing matter outlet;

(b) the hollow turbine housing enclosing a freely spinning hollow drive cylinder located within the hollow turbine housing and between and proximal the flared member and the tapered member;

(c) the freely spinning hollow drive cylinder comprising: an outer surface, a surficially raised helicoidal spinning vane, an inner surface, a top end and an opposite base end, a tapered internal wall, tapering from the top end toward the inner surface;

(d) a helicoidal impeller cooperatively engaged within the freely spinning hollow drive cylinder, the helicoidal impeller and the surficially raised helicoidal spinning vane being equivalently pitched;

(e) a south cylinder ring magnet affixed to and ringing the inner surface at the base end of the freely spinning hollow drive cylinder, the south cylinder magnet vertically repulsively supporting the immediately adjacent freely spinning hollow drive cylinder;

(f) a south housing ring magnet affixed to and ringing the interior side of the hollow turbine housing proximal to opposing the matter outlet and above the tapered member, the south housing ring magnet in repelling and bearing relation to the south cylinder ring magnet;

(g) a north cylinder ring magnet affixed to and ringing the inner surface at the top end of the freely spinning hollow drive cylinder, the north cylinder ring magnet vertically repulsively containing the immediately adjacent freely spinning hollow drive cylinder;

(h) a north housing ring magnet affixed to and ringing the interior side of the hollow turbine housing, proximal to the matter inlet and below the flared member, the north housing ring magnet in repelling and bearing relation to the north cylinder ring magnet;

(i) a pair of magnet retaining rings, located between north and south housing ring magnets and the flared member and tapered member, respectively;

(j) an iron-free serpentined coil group winding along the exterior side of the hollow turbine housing and secured to the hollow turbine housing by a fastening means;

(k) a plurality of linear magnets circumferentially arrayed lengthwise from the tapered internal wall proximally to the south cylinder ring magnet within the freely spinning hollow drive cylinder, in laterally, and alternating repelling and supporting relation with the iron-free serpentined coil group opposite the helicoidal impeller in the freely spinning hollow drive cylinder;

(l) the iron-free serpentined coil group being in alternating electrical current generating and rotational relation with the plurality of linear magnets;

(m) a plurality of connecting means connecting the pump/generator device to the pipeline;

(n) a plurality of o-rings sealingly located between the hollow turbine housing and the plurality of connecting means;

(o) the housing ring magnets repelling the cylinder ring magnets and securing in place the freely spinning hollow drive cylinder within the hollow turbine housing;

(p) the flowing matter flowing into the matter inlet through and rotating the helicoidal impeller, causing the freely spinning hollow drive cylinder containing the plurality of linear magnets to spin;

(q) whereby the plurality of linear magnets within the freely spinning hollow drive cylinder generate an electrical current in the iron-free serpentined coil group; and (r) the pump/generator device being connected by a pressurized recirculating pipeline in flow augmenting relation with the pipeline.

12. The apparatus according to claim 11, wherein said flowing matter comprises: a flowing liquid.

13. The device according to claim 11, wherein said flowing matter comprises: a flowing gas; and said apparatus further comprises: a gas exhaust.

14. The device according to claim 11, wherein the freely spinning hollow drive cylinder further comprises: the surficially raised helicoidal spinning vane pitched along the outer surface, the surficially raised helicoidal spinning vane being equivalently pitched as the helicoidal impeller and in contact inhibiting relation between the hollow turbine housing and the freely spinning hollow drive cylinder.

15. The device according to claim 11, wherein the hollow turbine housing further comprises: a pair of gauss cone filters fixedly attached to the interior side of the hollow turbine housing adjacent to the flared member and to the tapered member, respectively.

16. The device according to claim 11, wherein the hollow turbine housing further comprises: a plurality of matter straightening vanes set within the interior side of the flared member and the tapered member of the hollow turbine housing.

17. The device according to claim 11, wherein the freely spinning hollow drive cylinder further comprises: a plurality of thrust vanes angularly set within the tapered internal wall of the freely sinning hollow drive cylinder.

18. The device according to claim 11, wherein the matter inlet and the opposing matter outlet are interchangeable.

19. The device according to claim 11, wherein the iron-free serpentined coil group is made of copper wire.

20. A method of augmenting flowing matter flow and generating electricity using a pump/generator over-unity apparatus, said method comprising:

(a) arraying a plurality of pump/generator devices in flow augmenting relation, the method for each of the plurality pump/generator devices further comprising:

(i) receiving a flowing matter from a matter source in a hollow turbine housing, the hollow turbine housing having an interior side and an exterior side, the hollow turbine housing comprising: a matter inlet and an opposing matter outlet; a flared member proximal to the matter inlet, and a tapered member proximal to the opposing matter outlet;

(ii) enclosing a freely spinning hollow drive cylinder within the hollow turbine housing and between and proximal to the flared member and the tapered member, the freely spinning hollow drive cylinder comprising: an outer surface, a surficially raised helicoidal spinning vane, an inner surface, a top end and an opposite base end, a tapered internal wall, tapering from the top end toward the inner surface;

(iii) cooperatively engaging a helicoidal impeller within the freely spinning hollow drive cylinder, the helicoidal impeller and the surficially raised helicoidal spinning vane being equivalently pitched;

(iv) affixing and ringing a south cylinder ring magnet to the inner surface at the base end of the freely spinning hollow drive cylinder, repulsively supporting the immediately adjacent freely spinning hollow drive cylinder;

(v) affixing and ringing a south housing ring magnet to the interior side of the hollow turbine housing proximal to the opposing matter outlet and above the tapered member, the south housing ring magnet in repelling and bearing relation to the south cylinder ring magnet;

(vi) affixing and ringing a north cylinder ring magnet to the inner surface at the top end of the freely spinning hollow drive cylinder, the north cylinder ring magnet vertically repulsively containing the immediately adjacent freely spinning hollow drive cylinder;

(vii) affixing and ringing a north housing ring magnet to the interior side of the hollow turbine housing; proximal to the matter inlet and below the flared member, the north housing ring magnet in repelling and bearing relation to the north cylinder ring magnet;

(viii) locating a pair of magnet retaining rings between the north and south housing ring magnets and the flared member and tapered member, respectively, securing the housing ring magnets in the hollow turbine housing;

(ix) winding an iron-free serpentined coil group along the exterior side of the hollow turbine housing and securing the iron-free serpentined coil group to the hollow turbine housing by a fastening means;

(x) circumferentially arraying a plurality of linear magnets lengthwise from the tapered internal wall proximally to the south cylinder ring magnet within the freely spinning hollow drive cylinder, in laterally, and alternating repelling and supporting relation with the iron-free serpentined coil group opposite the helicoidal impeller in the freely spinning hollow drive cylinder, (xi) locating the iron-free serpentined coil group in alternating electrical current generating and rotational relation with the plurality of linear magnets;

(xii) locating a plurality of o-rings sealingly between the hollow turbine housing and a plurality of connecting means;

(xiii) repelling the cylinder ring magnets with the housing ring magnets and securing in place by the freely spinning hollow drive cylinder within the hollow turbine housing;

(xiv) flowing the flowing matter into the matter inlet through and rotating the helicoidal impeller, causing the freely spinning hollow drive cylinder containing the plurality of linear magnets to spin; and (xv) thereby generating an electrical current from the iron-free serpentined coil group by the plurality of linear magnets within the freely spinning hollow drive cylinder;

(b) serially arranging the plurality of pump/generator devices and connecting said pump/generator devices by a pressurized recirculating pipeline, said pipeline comprising a first pump connection, an opposite second pump connection and the plurality of connecting means connecting the pump/generator devices to the pipeline; and (c) having at least one pumping means being connected to a serial arrangement between the first pump connection and opposite second pump connection.

21. The method according to claim 20, wherein said flowing matter comprises: a flowing liquid.

22. The method according to claim 20, wherein the freely spinning hollow drive cylinder further comprises: the surficially raised helicoidal spinning vane pitched along the outer surface, the surficially raised helicoidal spinning vane being equivalently pitched as the helicoidal impeller, and in contact inhibiting relation between the hollow turbine housing and the freely spinning hollow drive cylinder.

23. The method according to claim 20, wherein the hollow turbine housing further comprises: a pair of gauss cone filters fixedly attached to the interior side of the hollow turbine housing adjacent to the flared member and to the tapered member, respectively.

24. The method according to claim 20, wherein the hollow turbine housing further comprises: a plurality of matter straightening vanes set within the interior side of the flared member and the tapered member of the hollow turbine housing.

25. The method according to claim 20, wherein the freely spinning hollow drive cylinder further comprises: a plurality of thrust vanes angularly set within the tapered internal wall of the freely spinning hollow drive cylinder.

26. The method according to claim 20, wherein the matter inlet and the opposing matter outlet are interchangeable.

27. The method according to claim 20, wherein the iron-free serpentined coil group is made of copper wire.

28. The method according to claim 20, wherein the pipeline further comprises: a venturi eductor comprising: an eductor tube having an eductor inlet and an opposing eductor outlet, a nozzle located within the eductor tube proximal to the eductor outlet and at least one venturi nozzle proximal to the eductor inlet.

29. The apparatus according to claim 20, wherein said flowing matter comprises: a flowing gas; and said apparatus further comprises: a gas exhaust.

* * * * *

UNITED STATES PATENT AND TRADEMARK OFFICE
CERTIFICATE OF CORRECTION

Page 1 of 1

PATENT NO.       : 9,166,458 B1
APPLICATION NO.  : 14/641815
DATED            : October 20, 2015
INVENTOR(S)      : Gordon Charles Burns, II et al.

It is certified that error appears in the above-identified patent and that said Letters Patent is hereby corrected as shown below:

ON THE TITLE PAGE

Item 12 Should Read

Burns, II et al.

Items 71 and 72 Should Read

The name of Inventor Gordon Charles Burns, III, is corrected to read Gordon Charles Burns, II.

Signed and Sealed this
Second Day of February, 2016

Michelle K. Lee
*Director of the United States Patent and Trademark Office*